United States Patent
Adachi et al.

(10) Patent No.: US 11,214,277 B2
(45) Date of Patent: Jan. 4, 2022

(54) CONTROL DEVICE FOR VEHICLE

(71) Applicant: Honda Motor Co.,Ltd., Tokyo (JP)

(72) Inventors: Takashi Adachi, Saitama (JP); Kentaro Arai, Saitama (JP); Tomoyuki Noguchi, Saitama (JP); Masayuki Sadakiyo, Saitama (JP); Hisashi Ishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 16/390,026

(22) Filed: Apr. 22, 2019

(65) Prior Publication Data

US 2019/0322289 A1    Oct. 24, 2019

(30) Foreign Application Priority Data

Apr. 23, 2018   (JP) .............................. JP2018-082478

(51) Int. Cl.
| | |
|---|---|
| *B60W 50/08* | (2020.01) |
| *G05D 1/00* | (2006.01) |
| *B60W 10/20* | (2006.01) |
| *B60W 10/10* | (2012.01) |
| *B60W 10/06* | (2006.01) |
| *B60W 20/30* | (2016.01) |

(52) U.S. Cl.
CPC .......... *B60W 50/087* (2013.01); *B60W 10/06* (2013.01); *B60W 10/10* (2013.01); *B60W 10/20* (2013.01); *B60W 20/30* (2013.01); *G05D 1/0061* (2013.01)

(58) Field of Classification Search
CPC .... B60W 50/087; B60W 20/30; B60W 10/10; B60W 10/06; B60W 10/20; B60W 60/0053; B60W 50/082; B60W 2050/0054; B60W 2050/007; B60W 30/182; B60W 10/04; G05D 1/0061; F16H 61/0213; F16H 2061/0227
See application file for complete search history.

(56) References Cited

U.S. PATENT DOCUMENTS

2018/0066750 A1\*   3/2018   Nishimine .......... F16H 61/0248

FOREIGN PATENT DOCUMENTS

| JP | 2007196808 | 8/2007 |
|---|---|---|
| JP | 2017146819 | 8/2017 |

\* cited by examiner

*Primary Examiner* — Brian P Sweeney
(74) *Attorney, Agent, or Firm* — JCIPRNET

(57) ABSTRACT

A control device for a vehicle capable of switching between an automated driving mode in which driving force of a vehicle having a transmission is automatically controlled and a manual driving mode in which the driving force of the vehicle is controlled on the basis of a driver's operation on the vehicle includes: an operation element to which the driver's operation is input; and a travel control unit that outputs a command value for selecting a gear range of the transmission. The travel control unit selects which of ordinary gear change control and gear change restricting control is to be performed on the basis of an operation performed on the operation element when there is an automated driving release request in which the automated driving mode is released and the automated driving mode is switched to the manual driving mode during traveling of the vehicle in the automated driving mode.

8 Claims, 8 Drawing Sheets

CONTROL DEVICE FOR VEHICLE

CROSS-REFERENCE TO RELATED APPLICATION

This application claims the priority benefit of Japan application serial no. 2018-082478, filed on Apr. 23, 2018. The entirety of the above-mentioned patent application is hereby incorporated by reference herein and made a part of this specification.

BACKGROUND

Technical Field

The disclosure relates to a control device for a vehicle and particularly to a control device for a vehicle that performs automated driving control for automatically controlling the driving force of a vehicle.

Description of Related Art

In the related art, there is a control device for a vehicle that includes an automated driving control unit for automatically controlling a host vehicle such that the host vehicle travels along a route to a destination as illustrated in Patent Document 1, for example. According to such a control device for a vehicle for automated driving control, it is necessary to shift the driving force of the vehicle from a driving force of the vehicle in an automated driving mode to a driving force that a driver of the vehicle requests in a manual driving mode when switching from an automated driving mode to a manual driving mode is performed during traveling of the vehicle.

In this case, if there is a large difference between the driving force of the vehicle in the automated driving mode and the driving force that the driver of the vehicle requests in the manual driving mode, there is a concern that sudden acceleration or deceleration of the vehicle and vibration of the vehicle will occur if a gear change operation in accordance with the requested driving force is performed, and there is a concern that this will affect the comfort of riding in the vehicle. Therefore, it is necessary to smoothly switch the driving mode by shifting the driving force without causing sudden acceleration or deceleration of the vehicle and vibration of the vehicle as described above.

A driver typically does not depress an accelerator pedal in an automated driving mode. Therefore, in a case in which a driver requests a desired driving force of the vehicle immediately after an automated driving mode is released, by how much the driver should depress the accelerator pedal will not be known.

Thus, according to Patent Document 2, for example, an accelerator pedal is caused to be moved to a predetermined position with an actuator when an automated driving mode is released in order to make the driving force of the vehicle in the automated driving mode correspond to the driving force of the vehicle in the manual driving mode. Specifically, according to Patent Document 2, the position of an operation mechanism such as an accelerator pedal is caused to be moved to the position of the accelerator pedal as indicated by an automated driving control device at the time of releasing the automated driving mode, when the driver provides an automated driving release request. In this manner, it is possible to make a pseudo-accelerator opening in the automated driving mode physically correspond to an accelerator opening in the manual driving mode, such that the driving force that the vehicle employs in the automated driving mode corresponds to the driving force that the driver requests of the vehicle in the manual driving mode, and thereby to smoothly switch the driving mode.

However, if the actuator is provided in the vehicle, there are problems that the number of components increases, and this leads to an increase in size of the device and an increase in costs.

PATENT DOCUMENTS

[Patent Document 1] Japanese Unexamined Patent Application Publication No. 2017-146819
[Patent Document 2] Japanese Unexamined Patent Application Publication No. 2007-196808

SUMMARY

The disclosure provides a control device for a vehicle capable of smoothly switching driving mode with a simple configuration in a case of shifting driving force of a vehicle in an automated driving mode to driving force that a driver of the vehicle requests in a manual driving mode.

There is provided a control device for a vehicle, capable of switching between an automated driving mode in which driving force of a vehicle 1 that has a power source EG and a transmission TM that performs gear change for rotation using the power delivered from the power source EG is automatically controlled and a manual driving mode in which the driving force of the vehicle 1 is controlled on the basis of a driver's operation on the vehicle 1, the control device including: an operation element to which the driver's operation is input in order to control the driving force of the vehicle 1; and a travel control unit 120 that outputs a travel control command value including a command value for selecting a gear range of the transmission TM, in which the travel control unit 120 decides the gear range of the transmission TM on the basis of the driving force of the vehicle 1, and is able to select an ordinary gear change control and gear change restricting control that restricts a change in gear range as compared with the ordinary gear change control, and the travel control unit 120 selects which of the ordinary gear change control and the gear change restricting control is to be performed on the basis of an operation performed on the operation element when there is an automated driving release request in which the automated driving mode is released and the automated driving mode is switched to the manual driving mode during traveling of the vehicle in the automated driving mode.

In a case of switching the driving mode in response to the automated driving release request during the traveling of the vehicle in this manner, it is possible to prevent a gear change operation that is not expected by the driver if whether or not to restrict change in transmission range of the transmission is decided on the basis of a driver's operation on the operation element. Therefore, it is possible to prevent sudden acceleration or deceleration of the vehicle and vibration of the vehicle due to the gear change that the driver does not expect. In addition, since restriction of the gear change is performed through control of the travel control unit, no new member is needed. Therefore, it is possible to restrict the gear change with a simple configuration without increasing the number of members. Accordingly, it is possible to smoothly switch the driving mode with a simple configuration.

Also, the aforementioned control device for a vehicle as described above may include a plurality of shift maps 55*a*, 55b, 55c that are for deciding the gear range of the transmission TM, and the travel control unit 120 may use an ordinary shift map 55a in a case in which the ordinary gear change control is performed, and use a shift map 55b, 55c that is used for restricting change in gear range as compared with the ordinary shift map 55a in a case in which gear change restricting control is performed.

In this manner, it is possible to perform control with a simple configuration by employing a configuration in which the plurality of shift maps in accordance with a plurality of kinds of gear change control are provided and performing gear change control using different shift maps when the gear change control is performed.

Also, in the aforementioned control device for a vehicle, the gear change restricting control may include a control for restricting the change in gear range by expanding a range of the driving force that is used the transmission range when the automated driving release request is provided as compared with an ordinary range.

In this manner, it becomes easier to use the gear range at the time of switching the driving mode after switching the driving mode by performing a control for expanding the range of the driving force used in this gear range when an automated driving release request is provided as compared with the ordinary range in the gear change restricting control, and it is thus possible to restrict gear change. Therefore, it is possible to prevent sudden acceleration or deceleration of the vehicle and vibration of the vehicle due to the gear change operation.

Also, in the aforementioned control device for a vehicle, the gear change restricting control may include control for maintaining the gear range for a predetermined period of time when the automated driving release request is provided.

In this manner, the gear range at the time of switching the driving mode can be reliably maintained for a predetermined period of time even after switching the driving mode by performing control for maintaining the gear range for a predetermined period of time when the automated driving release request is provided in the gear change restricting control. Therefore, it is possible to prevent sudden acceleration or deceleration of the vehicle and vibration of the vehicle due to the gear change operation.

Also, in the aforementioned control device for a vehicle, a length of the predetermined period of time may be decided on the basis of the operation performed on the operation element.

In this manner, gear change control as the driver intends is better achieved by deciding the length of the predetermined period of time during which the gear range is held after switching the driving mode on the basis of the driver's operation on the operation element.

Also, in the aforementioned control device for a vehicle, the predetermined period of time may set to be short in a case in which no operation is performed on the operation element, and the predetermined period of time is set to be long in a case in which an operation is performed on the operation element.

In a case in which no operation is performed on the operation element after switching the driving mode in this manner, it is assumed that the driver does not need further driving force. In this case, since gear change that the driver does not expect is not performed even if the ordinary gear change control is performed, the predetermined period of time during which the gear range is held is set to be short. Meanwhile, in a case in which an operation is performed on the operation element after switching the driving mode, the period of time during which the gear range is held and the gear change operation is restricted is set to be long, thereby preventing an unexpected gear change operation. Therefore, it is possible to set the predetermined period of time during which the gear range is held to have a reasonable length.

Also, in the aforementioned control device for a vehicle, a low-speed following travel mode in which the vehicle follows a preceding vehicle in a low-speed region may be provided, the automated driving release request is input from the vehicle 1 or the driver, and in a case in which the automated driving release request has been input from the vehicle 1, and in a case in which the travel control unit 120 is able to calculate the driving force of the vehicle 1 in the low-speed following travel mode, the travel control unit 120 performs control for restricting the change in gear range by expanding the range of the driving force that uses the gear range when the automated driving release request is provided as compared with an ordinary range in the gear change restricting control.

In a case in which it is possible to calculate the driving force in the low-speed following travel mode in this manner, it is possible to perform appropriate gear change restricting control and to prevent sudden acceleration or deceleration of the vehicle and vibration of the vehicle due to the gear change operation if the control for restricting the change in gear range is performed by expanding the range of the driving force when the gear range when the automated driving release request is provided as compared with an ordinary range in the gear change restricting control.

Also, in the aforementioned control device for a vehicle, a low-speed following travel mode in which the vehicle follows a preceding vehicle in a low-speed region may be provided, the automated driving release request is input from the vehicle 1 or the driver, and in a case in which the automated driving release request has been input from the vehicle 1, and in a case in which the travel control unit 120 is not able to calculate the driving force of the vehicle 1 in the low-speed following travel mode, the travel control unit 120 performs control for maintaining the gear range for a predetermined period of time when the automated driving release request is provided in the gear change restricting control.

In this manner, it is possible to prevent sudden acceleration or deceleration of the vehicle and vibration of the vehicle due to the gear change operation if the gear change restricting control is performed by maintaining the gear change for the predetermined period of time in a case in which it is not possible to calculate the driving force in the low-speed following travel mode.

Also, in the aforementioned control device for a vehicle, when the automated driving release request in which the automated driving mode is released and the automated driving mode is switched to the manual driving mode is provided during traveling of the vehicle in the automated driving mode, the travel control unit 120 performs driving force shifting control for gradually shifting the driving force of the vehicle 1 from the driving force of the vehicle 1 in the automated driving mode to the driving force that the driver requests in the manual driving mode.

In this manner, it is possible to prevent sudden acceleration or deceleration of the vehicle and vibration of the vehicle by performing the driving force shifting control for gradually shifting the driving force of the vehicle from the driving force of the vehicle in the automated driving mode to the driving force that the driver requests in the manual driving mode.

Note that the aforementioned reference numerals in parentheses are reference numerals of corresponding components in the embodiment, which will be described later, as examples of the disclosure.

According to the control device for a vehicle of the disclosure, it is possible to smoothly switch the driving mode with a simple configuration even in a case in which the driving force of the vehicle in the automated driving mode is shifted to the driving force that the driver of the vehicle requests in the manual driving mode.

DESCRIPTION OF THE EMBODIMENTS

Figure 1:
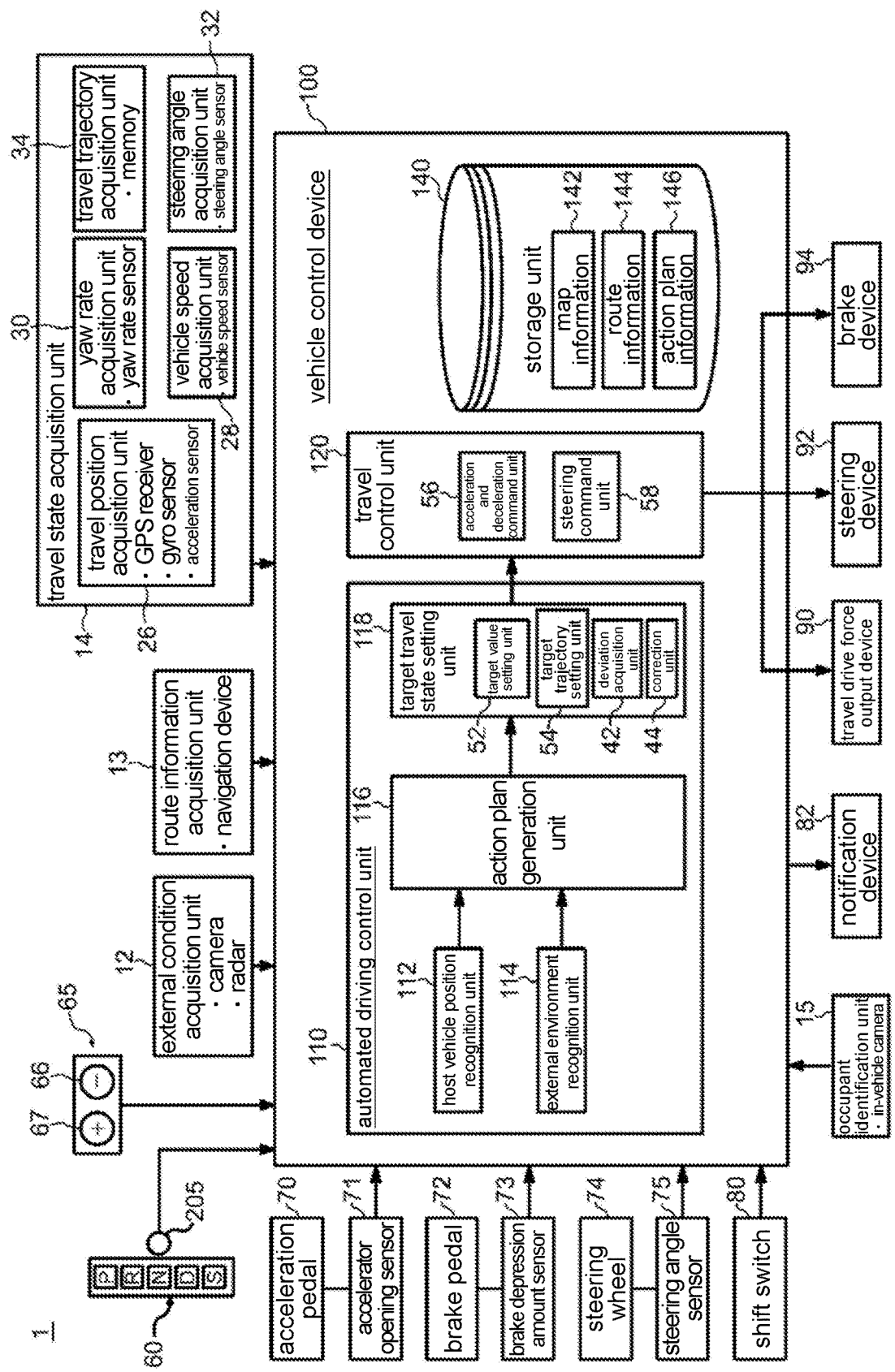
FIG. 1 is a functional configuration diagram of a control device for a vehicle according to an embodiment of the disclosure.

Hereinafter, embodiments of the disclosure will be described with reference to the accompanying drawings. FIG. 1 is a functional configuration diagram of a vehicle control device 100 mounted in a vehicle 1. A configuration of the vehicle control device 100 will be described using the drawing. The vehicle 1 (host vehicle) in which the vehicle control device 100 is mounted is, for example, a vehicle with two wheels, three wheels, four wheels, or the like and includes a vehicle using an internal combustion engine as a power source, an electric vehicle using an electric motor as a power source, a hybrid vehicle that includes both an internal combustion engine and an electric motor, and the like. Also, the aforementioned electric vehicle is driven using electric power discharged by a battery such as a secondary battery, a hydrogen fuel battery, a metal fuel battery, or an alcohol fuel battery, for example.

The control device 100 includes a mechanism for taking various kinds of information from the outside of the vehicle 1, such as an outer condition acquisition unit 12, a route information acquisition unit 13, and a travel state acquisition unit 14. In addition, the control device 100 includes operation devices (operation elements), to which operations are input, such as an accelerator pedal 70 (accelerator operation element), a brake pedal 72, a steering wheel 74 (handle), and a shift switch 80. The control device 100 includes operation detection sensors such as an accelerator opening sensor 71, a brake depression amount sensor 73 (brake switch), and a steering angle sensor 75 (or a steering torque sensor), a notification device 82 (output unit), and an occupant identification unit 15 (in-vehicle camera). Also, the control device 100 includes a travel driving force output device 90 (drive device), a steering device 92, and a brake device 94 as devices for driving or steering the vehicle 1.

These devices and equipment are connected to each other via multiple communication lines such as controller area network (CAN) communication lines, serial communication lines, a wireless communication network, or the like. Note that the operation devices described as examples are only examples, and a button, a dial switch, a graphical user interface (GUI) switch, and the like may be mounted in the vehicle 1.

The outer condition acquisition unit 12 is configured to acquire outer conditions of the vehicle 1, for example, environmental information in the surroundings of the vehicle such as lanes of a traveling path and objects in the surroundings of the vehicle. The outer condition acquisition unit 12 includes various cameras (a monocular camera, a stereo camera, an infrared camera, and the like) and various radars (a millimeter wave radar, a microwave radar, a laser radar, and the like), for example. Also, it is possible to use a fusion sensor that merges information obtained by the cameras with information obtained by the radars.

The route information acquisition unit 13 includes a navigation device. The navigation device has a global navigation satellite system (GNSS) receiver, map information (navigation map), a touch panel-type display device that functions as a user interface, a speaker, a microphone, and the like. The navigation device specifies the position of the vehicle 1 using the GNSS receiver and derives a route from the position to a destination designated by a user. The route derived by the navigation device is stored as route information 144 in a storage unit 140. The position of the vehicle 1 may be specified or interpolated by an inertial navigation system (INS) using outputs of the travel state acquisition unit 14. Also, the navigation device provides guidance on the route to the destination using voice or navigation display when the control device 100 executes the manual driving mode. Note that the configuration for specifying the position of the vehicle 1 may be provided independently from the navigation device. Also, the navigation device may be realized as one function of a terminal device such as a smartphone or a tablet terminal that the user owns, for example. In this case, information is transmitted and received between the terminal device and the control device 100 in wireless or wired communication.

The travel state acquisition unit 14 is configured to acquire a current travel state of the vehicle 1. The travel state acquisition unit 14 includes a travel position acquisition unit 26, a vehicle speed acquisition unit 28, a yaw rate acquisition unit 30, a steering angle acquisition unit 32, and a travel trajectory acquisition unit 34.

The travel position acquisition unit 26 is configured to acquire the travel position of the vehicle 1 and the posture (travel direction) of the vehicle 1 as one example of a travel state. The travel position acquisition unit 26 includes various position measurement devices, for example, devices (a GPS receiver, a GNSS receiver, a beacon receiver, and the like) that receive electromagnetic waves transmitted from satellites and devices on streets and acquire position information (latitudes, longitudes, altitudes, coordinates, and the like), a gyro sensor, an acceleration sensor, and the like. The travel position of the vehicle 1 is measured with reference to a specific location of the vehicle 1.

The vehicle speed acquisition unit 28 is configured to acquire a velocity (vehicle speed) of the vehicle 1 as one example of a travel state. The vehicle speed acquisition unit 28 includes a speed sensor or the like provided at one or more wheels, for example.

The yaw rate acquisition unit 30 is configured to acquire a yaw rate of the vehicle 1 as one example of a travel state. The yaw rate acquisition unit 30 includes a yaw rate sensor or the like, for example.

The steering angle acquisition unit 32 is configured to acquire a steering angle as one example of a travel state. The steering angle acquisition unit 32 includes a steering angle sensor or the like provided at a steering shaft, for example. Here, a steering angle speed and a steering angle acceleration are also acquired on the basis of the acquired steering angle.

The travel trajectory acquisition unit 34 is configured to acquire information regarding an actual travel trajectory of the vehicle 1 (actual travel trajectory) as one example of a travel state. The actual travel trajectory includes a trajectory (track) through which the vehicle 1 has actually traveled and may include a trajectory through which the vehicle 1 is scheduled to travel from now, for example, an extension on the front side in the travel direction of the trajectory (track) through which the vehicle 1 has traveled. The travel trajectory acquisition unit 34 includes a memory. The memory stores position information regarding a sequence of a series of dots included in the actual travel trajectory. Also, the extension can be predicted using a computer or the like.

The accelerator opening sensor 71, the brake depression amount sensor 73, and the steering angle sensor 75 that are operation detection sensors output an accelerator opening degree, a brake depression amount, and a steering angle that are detection results to the vehicle control device 100.

The shift switch 80 is a switch that is operated by an occupant of the vehicle 1. The shift switch 80 receives an operation performed by the occupant and switches driving mode (for example, the automated driving mode and the manual driving mode) in response to content of the received operation. For example, the shift switch 80 generates a driving mode designation signal for designating a driving mode of the vehicle 1 from the content of the operation performed by the occupant and outputs the driving mode designation signal to the vehicle control device 100.

In addition, the vehicle 1 according to the embodiment includes a shift device 60 that is operated by the driver via a shift lever. Positions of the shift lever (not illustrated) in the shift device 60 include parking (P), reverse travel (R), neutral (N), forward travel in an automated gear change mode (normal mode) (D), forward travel in a sport mode (S), and the like, as illustrated in FIG. 1.

A shift position sensor 205 is provided in the vicinity of the shift device 60. The shift position sensor 205 detects the position of the shift lever operated by the driver. Information regarding the shift position detected by the shift position sensor 205 is input to the vehicle control device 100. Note that the information regarding the shift position detected by the shift position sensor 205 is output directly to the travel driving force output device 90 (AT-ECU 5) in the manual driving mode.

In addition, the vehicle 1 according to the embodiment includes a paddle switch 65 provided in the vicinity of the steering wheel 74. The paddle switch 65 is configured of a minus button 66 (− switch) for providing a shift-down command in a manual gear change mode during manual driving (manual driving mode) and a plus button 67 (+ switch) for providing a shift-up command in a manual gear change mode. In the manual gear change mode (manual mode) of the automated transmission TM (transmission) in the manual driving mode, operation signals of the minus button 66 and the plus button 67 are output to the vehicle control device 100, and shift-up or shift-down of a gear range set by the automated transmission TM is performed in accordance with the travel states or the like of the vehicle 1. Note that if either the minus button 66 or the plus button 67 is operated by the driver using the paddle switch 65 when the automated gear change mode is changed when the position of the shift lever is in the D range or the S range, for example, during manual driving, the automated gear change mode is switched to the manual gear change mode (manual mode) in the embodiment.

The notification device 82 includes various devices capable of outputting information. The notification device 82 outputs information for promoting switching from the automated driving mode to the manual driving mode to the occupant of the vehicle 1, for example. As the notification device 82, at least one of a speaker, a vibrator, a display device, a light emitting device, and the like is used, for example.

The occupant identification unit 15 includes an in-vehicle camera capable of imaging the interior of the vehicle 1, for example. The in-vehicle camera may be a digital camera using a solid-state imaging element such as a CCD or a CMOS, a near-infrared camera combined with a near-infrared light source, or the like. The vehicle control device 100 can acquire an image captured by the in-vehicle camera and identify the current driver of the vehicle 1 from an image of the face of the driver of the vehicle 1 included in the image.

Figure 2:
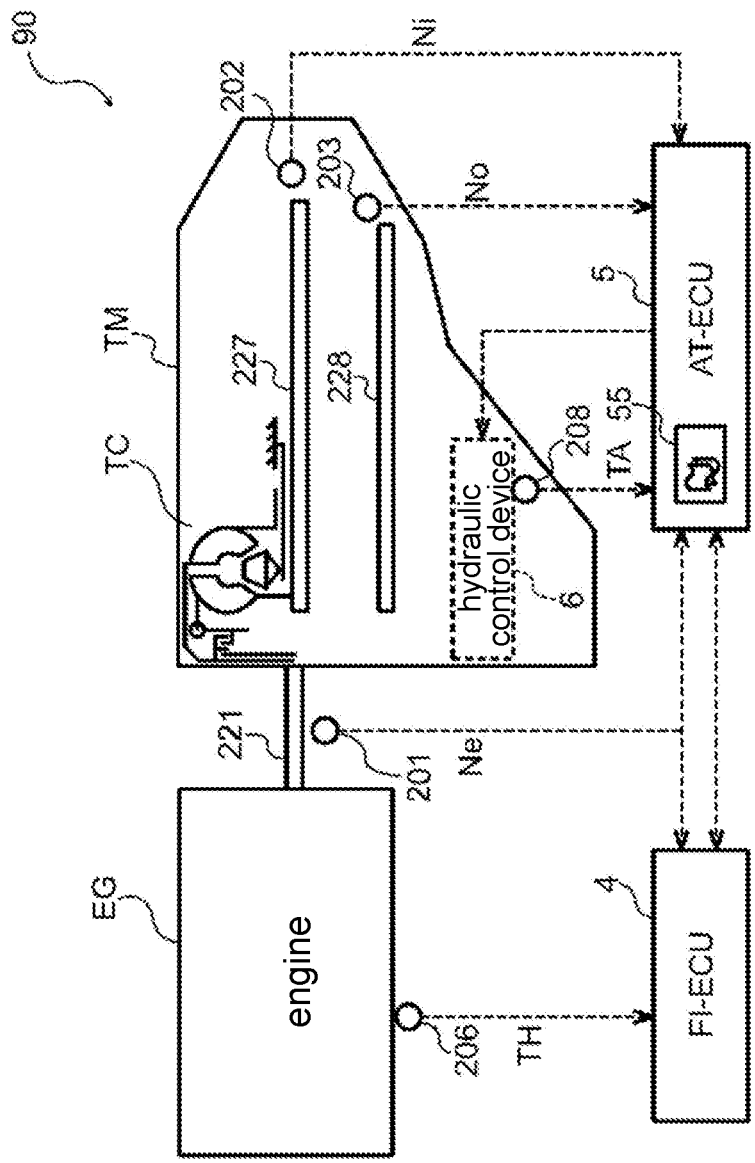
FIG. 2 is an outline diagram illustrating a configuration of a travel driving force output device included in the vehicle.

The travel driving force output device 90 (drive device) is configured to include an engine EG (drive source), an FI-electronic control unit (ECU) 4 that controls the engine EG, an automated transmission TM, and an AT-ECU 5 that controls the automated transmission TM as illustrated in FIG. 2. Note that in a case in which the vehicle 1 is an electric vehicle that uses an electric motor as driving force, a travel motor and a motor ECU that controls the travel motor may be provided in the travel driving force output device 90. In a case in which the vehicle 1 is a hybrid vehicle, the engine, the engine ECU, the travel motor, and the motor ECU may be provided. In a case in which the travel driving force output device 90 is configured to include the engine EG and the automated transmission TM as in the embodiment, the FI-ECU 4 and the AT-ECU 5 controls throttle opening of the engine EG, the shift range of the automated transmission TM, and the like in accordance with information input from the travel control unit 120, which will be described later, and outputs travel driving force (torque) used by the vehicle 1 to travel. Also, in a case in which the travel driving force output device 90 includes only the travel motor, the motor ECU adjusts a duty ratio of a PWM signal to be applied to the travel motor in accordance with information input from the travel control unit 120 and outputs the aforementioned travel driving force. In addition, in a case in which the travel driving force output device 90 includes the engine and the travel motor, both the FI-ECU and the motor ECU cooperate with each other and control the travel driving force in accordance with information input from the travel control unit 120.

The steering device 92 includes an electric motor, for example. The electric motor causes force to act on a rack-and-pinion mechanism and changes an orientation of a steered wheel. The steering device 92 drives the electric motor and changes the orientation of the steered wheel in accordance with information input from the travel control unit 120.

The brake device 94 is an electric servo brake device that includes a brake caliper, a cylinder that delivers a hydraulic pressure to the brake caliper, an electric motor that causes the cylinder to generate a hydraulic pressure, and a brake control unit. The brake control unit of the electric servo brake device controls the electric motor in accordance with information input from the travel control unit 120 such that a brake torque (brake force output device) that outputs brake force in accordance with a brake operation is output to each wheel. The electric servo brake device may include, as backup, a mechanism that delivers the hydraulic pressure generated through the operation of the brake pedal 72 to the cylinder via a master cylinder.

Note that the brake device 94 is not limited to the aforementioned electric servo brake device and may be an electronic control-type hydraulic brake device. The electronic control-type hydraulic brake device controls an actuator in accordance with information input from the travel control unit 120 and delivers the hydraulic pressure of the master cylinder to the cylinder. Also, the brake device 94 may include a regenerative brake using a traveling motor in a case in which the travel driving force output device 90 includes the traveling motor.

Next, the vehicle control device 100 will be described. The vehicle control device 100 includes the automated driving control unit 110, the travel control unit 120, and the storage unit 140. The automated driving control unit 110 includes a host vehicle position recognition unit 112, an external environment recognition unit 114, an action plan generation unit 116, a target travel state setting unit 118. The respective components of the automated driving control unit 110 and a part or entirety of the travel control unit 120 are realized by a processor such as a central processing unit (CPU) executing programs. Also, a part or entirety thereof may be realized by hardware such as large scale integration (LSI) or an application specific integrated circuit (ASIC). In addition, the storage unit 140 is realized by a read only memory (ROM), a random access memory (RAM), a hard disk drive (HDD), a flash memory, or the like. The programs executed by the processor may be stored in the storage unit 140 in advance or may be downloaded from an external device via in-vehicle Internet equipment or the like. Also, the programs may be installed on the storage unit 140 by a portable storage medium that stores the programs being attached to a drive device, which is not illustrated in the drawing. In addition, the vehicle control device 100 may be implemented by a plurality of computer devices in a distributed manner. In this manner, it is possible to realize various kinds of processing in the embodiment by causing the in-vehicle computer in the vehicle 1 to cooperate with the aforementioned hardware functional units and software such as programs.

The automated driving control unit 110 performs control by switching the driving mode in accordance with a signal input from the shift switch 80. Although the driving modes include a driving mode in which acceleration and deceleration and steering of the vehicle 1 are automatically controlled (automated driving mode) and a driving mode in which acceleration and deceleration of the vehicle 1 are controlled on the basis of operations performed on the operation devices such as the accelerator pedal 70 and the brake pedal 72 and steering is controlled on the basis of operations performed on the operation devices such as the steering wheel 74 (manual driving mode), the driving modes are not limited thereto. As another driving mode, for example, a driving mode in which one of acceleration and deceleration and steering of the vehicle 1 is automatically controlled and the other is controlled on the basis of operations performed on the operation devices (semi-automated driving mode). Note that "automated driving" in the following description is assumed to include the semi-automated driving mode in addition to the aforementioned automated driving mode.

Note that the automated driving control unit 110 may stop operations, and an input signal from the operation detection sensor may be output to the travel control unit 120 or may be supplied directly to the travel driving force output device 90 (the FI-ECU or the AT-ECU), the steering device 92, or the brake device 94 when the manual driving mode is performed.

The host vehicle position recognition unit 112 of the automated driving control unit 110 recognizes a lane (travel lane) in which the vehicle 1 is traveling and a relative position of the vehicle 1 with respect to the travel lane on the basis of the map information 142 stored in the storage unit 140 and the information input from the outer condition acquisition unit 12, the route information acquisition unit 13, or the travel state acquisition unit 14. The map information 142 is map information that is more accurate than the navigation map that the route information acquisition unit 13 has and includes information regarding centers of lanes, information regarding boundaries of lanes, or the like, for example. More specifically, the map information 142 includes road information, traffic restriction information, address information (addresses, postal codes), facility information, telephone number information, and the like. The road information includes information representing types of roads such as highways, toll roads, national roads, prefectural roads, the numbers of lanes of the roads, widths of the lanes, gradients of roads, positions of roads, (three-dimensional coordinates including latitudes, longitudes, altitudes), curvatures of curves of lanes, positions of merging and branching points of lanes, traffic signs provided on roads, and the like. The traffic restriction information includes information regarding lane blockage due to construction, traffic accidents, traffic jams, and the like.

The host vehicle position recognition unit 112 recognizes, as the relative position of the vehicle 1 with respect to the travel lane, a distance between a reference point (a gravity center, for example) of the vehicle 1 and the center of the travel lane and an angle relative to a line connecting the center of the travel line in the travel direction of the vehicle 1, for example. Note that the host vehicle position recognition unit 112 may recognize, as the relative position of the vehicle 1 with respect to the travel lane, the position of the reference point of the vehicle 1 relative to any side end of the travel line.

The external environment recognition unit 114 recognizes states of vehicles in the surroundings, such as the positions, the speeds, and the acceleration on the basis of the information input from the outer condition acquisition unit 12 or the like. The vehicles in the surroundings according to the embodiment are other vehicles that travel in the surroundings of the vehicle 1 in the same direction as that of the vehicle 1. The positions of the vehicles in the surroundings may be represented by representative points such as the gravity center or corners of the vehicle 1 or may be represented by a region expressed with an outline of the vehicle 1. The "states" of the vehicles in the surroundings may include acceleration of the vehicles in the surroundings and whether or not the vehicles have experienced lance change (or whether or not the vehicles are trying to change lanes) on the basis of the information from the aforementioned various machines. Also, the external environment recognition unit 114 may recognize positions of a guard rails, poles, parked vehicles, pedestrians, and other objects in addition to the vehicles in the surroundings.

The action plan generation unit 116 sets an automated driving start point, an automated driving end scheduled point, and/or an automated driving destination. The automated driving start point may be a current position of the vehicle 1 or may be a point at which an operation of providing a command for automated driving is provided by the occupant of the vehicle 1. The action plan generation unit 116 generates an action plan in a section between the start point and the end scheduled point or in a section between the start point and the automated driving destination. Note that the disclosure is not limited thereto and the action plan generation unit 116 may generate the action plan in any section.

The action plan is configured of a plurality of events that are executed in order, for example. The events include a deceleration event of decelerating the vehicle 1, an acceleration event of accelerating the vehicle 1, a lane keeping event of causing the vehicle 1 to travel without departing from the travel lane, a lane change event of causing the vehicle 1 to change the travel lane, an overtaking event of causing the vehicle 1 to overtake a vehicle traveling in front of the vehicle 1, a branching event of causing the vehicle 1 to change a lane to a desired lane at a branching point or causing the vehicle 1 to travel departing from the current travel lane, and a merging event of causing the vehicle 1 to accelerate or decelerate in the merging lane for merging with a main lane and change the travel lane, for example In a case in which a toll road (for example, a highway) includes a junction (branching point), for example, the vehicle control device 100 changes lanes or keep traveling on the same lane such that the vehicle 1 advances in the direction to the destination. Therefore, in a case in which it is determined that there is a junction on a road with reference to the map information 142, the action plan generation unit 116 sets a lane change event to change the lane to a desired lane along which the vehicle 1 can advance in the direction to the destination from the current position (coordinates) of the vehicle 1 to the position of the junction (coordinates). Note that the information indicating the action plan generated by the action plan generation unit 116 is stored as action plan information 146 in the storage unit 140.

The target travel state setting unit 118 is configured to set a target travel state that is a travel state targeted by the vehicle 1 on the basis of the action plan decided by the action plan generation unit 116 and the various kinds of information acquired by the outer condition acquisition unit 12, the route information acquisition unit 13, and the travel state acquisition unit 14. The target travel state setting unit 118 includes a target value setting unit 52 and a target trajectory setting unit 54. Also, the target travel state setting unit 118 includes a deviation acquisition unit 42 and a correction unit 44.

The target value setting unit 52 is configured to set information regarding a travel position (latitudes, longitudes, altitudes, coordinates, and the like) targeted by the vehicle 1 (also simply referred to as a target position), a target vehicle speed value information (also simply referred to as a target vehicle speed), and target yaw rate value information (also simply referred to as a target yaw rate). The target trajectory setting unit 54 is configured to set target trajectory information of the vehicle 1 (also simply referred to as a target trajectory) on the basis of the outer conditions acquired by the outer condition acquisition unit 12 and travel route information acquired by the route information acquisition unit 13. The target trajectory includes information regarding a target position of each unit time. Each target position is associated with posture information (travel direction) of the vehicle 1. Also, each target position may be associated with target value information such as a vehicle speed, acceleration, a yaw rate, lateral G force, a steering angle, and a steering angular acceleration. The aforementioned target position, target vehicle speed, target yaw rate, and target trajectory are information indicating the target travel state.

The deviation acquisition unit 42 is configured to acquire deviation of an actual travel state with respect to the target travel state on the basis of the target travel state set by the target travel state setting unit 118 and the actual travel state acquired by the travel state acquisition unit 14.

The correction unit 44 is configured to correct the target travel state in accordance with the deviation acquired by the deviation acquisition unit 42. Specifically, a new target travel state is set by causing the target travel state set by the target travel state setting unit 118 to further approach the actual travel state acquired by the travel state acquisition unit 14 as the deviation increases.

The travel control unit 120 is configured to control traveling of the vehicle 1. Specifically, the travel control unit 120 outputs a command value for travel control such that the travel state of the vehicle 1 coincides with or approaches the target travel state set by the target travel state setting unit 118 or the new target travel state set by the correction unit 44. The travel control unit 120 includes an acceleration and deceleration command unit 56 and a steering command unit 58.

The acceleration and deceleration command unit 56 is configured to control acceleration and deceleration in the travel control for the vehicle 1. Specifically, the acceleration and deceleration command unit 56 arithmetically operates an acceleration and deceleration command value for causing the travel state of the vehicle 1 to coincide with the target travel state on the basis of the target travel state (target acceleration and deceleration) set by the target travel state setting unit 118 or the correction unit 44 and the actual travel state (actual acceleration or deceleration).

The steering command unit 58 is configured to control steering in the travel control for the vehicle 1. Specifically, the steering command unit 58 arithmetically operates a steering angular speed command value for causing the travel state of the vehicle 1 to coincide with the target travel state on the basis of the target travel state set by the target travel state setting unit 118 or the correction unit 44 and the actual travel state.

FIG. 2 is an outline diagram illustrating a configuration of the travel driving force output device 90 included in the vehicle 1. As illustrated in the drawing, the travel driving force output device 90 of the vehicle 1 according to the embodiment includes an engine EG that is an internal combustion engine and an automated transmission TM that is coupled to the engine EG via a torque converter TC with a lock-up clutch. The automated transmission TM is a transmission that performs gear change for rotation using driving force delivered from the engine EG and outputs the rotation to the driving wheels and is an automated transmission with stages in which a plurality of gear ranges for forward traveling and one gear range for backward traveling are able to be set.

In addition, the travel driving force output device 90 includes an fuel injection control device (FI-ECU) 4 that electronically controls the engine EG, an automated transmission control device (AT-ECU) 5 that electronically controls the automated transmission TM including the torque converter TC, and a hydraulic control device 6 that performs rotation drive and lock-up control of the torque converter TC in accordance with control performed by the AT-ECU 5 and hydraulic control of fastening (engagement)/release of a plurality of friction engagement mechanisms included in the automated transmission TM.

The rotation output of the engine EG is output to a crankshaft 221 (an output shaft of the engine EG) and is delivered to an input shaft 227 of the automated transmission TM via the torque converter TC.

A crankshaft rotational frequency sensor 201 that detects a rotational frequency Ne of the crankshaft 221 (engine EG) is provided. In addition, an input shaft rotational frequency sensor 202 that detects a rotational frequency Ni of the input shaft 227 (the input shaft rotational frequency of the automated transmission TM) is provided. Also, an output shaft rotational frequency sensor 203 that detects a rotational frequency No of an output shaft 228 (an output shaft rotational frequency of the automated transmission TM) is provided. Data of the rotation frequencies Ne, Ni, and No detected by the respective sensors 201 to 203 and vehicle speed data calculated from No is provided to the AT-ECU 5. Also, the data of the rotational frequency Ne of the engine EG is provided to the FI-ECU 4. Also, a throttle opening sensor 206 that detects a throttle opening TH of the engine EG is provided. Data of the throttle opening TH is provided to the FI-ECU 4.

The AT-ECU 5 that controls the automated transmission TM has shift maps 55 (gear change properties) that define a region of gear ranges that can be set by the automated transmission TM in accordance with the vehicle speed detected by the vehicle speed sensor, the acceleration opening detected by the accelerator opening sensor 71, and the like. As the shift maps 55, shift maps of a plurality of types with different properties that include upshift lines and downshift lines set for the respective gear ranges are prepared in advance. In the gear change control performed by the automated transmission TM, the AT-ECU 5 performs control for switching the gear range of the automated transmission TM in accordance with a shift map selected from the shift maps of the plurality of types.

[Outline of Manual Driving Control]

In a case in which the manual driving mode is selected, control for the vehicle 1 (control of acceleration or deceleration and steering) based on a driver's operation in the related art is performed without the automated driving control unit 110 interposed therebetween in the vehicle 1. In the manual driving mode, detection information of the accelerator opening sensor 71 that is an operation detection sensor is input directly to the FI-ECU 4 or the AT-ECU 5 of the travel driving force output device 90, and the FI-ECU 4 or the AT-ECU 5 controls the engine EG and the automated transmission TM (hydraulic control device 6) on the basis of the detection information. Also, the brake device 94 is controlled on the basis of detection information of the brake depression amount sensor 73. In this manner, acceleration or deceleration of the vehicle is controlled. In addition, the steering device 92 is controlled on the basis of detection information of the steering angle sensor 75. In this manner, steering of the vehicle is performed.

[Outline of Automated Driving Control]

In the vehicle 1, the automated driving control unit 110 performs automated driving control of the vehicle 1 in a case in which the automated driving mode is selected by a driver's operation on the shift switch 80. In the automated driving control, the automated driving control unit 110 ascertains the current travel state (an actual travel trajectory, a travel position, and the like) of the vehicle 1 on the basis of information acquired from the outer condition acquisition unit 12, the route information acquisition unit 13, the travel state acquisition unit 14, and the like or information recognized by the host vehicle position recognition unit 112 and the external environment recognition unit 114. The target travel state setting unit 118 sets a target travel state (a target trajectory and a target position) that is a target travel state of the vehicle 1 on the basis of the action plan generated by the action plan generation unit 116. The deviation acquisition unit 42 acquires a deviation of the actual travel state relative to the target travel state. The travel control unit 120 performs travel control such that the travel state of the vehicle 1 coincides with or approaches the target travel state in a case in which a deviation is acquired by the deviation acquisition unit 42.

The correction unit 44 corrects a target trajectory or a target position on the basis of the travel position acquired by the travel position acquisition unit 26. The travel control unit 120 performs acceleration and deceleration control of the vehicle 1 using the travel driving force output device 90 and the brake device 94 on the basis of the vehicle speed and the like acquired by the vehicle speed acquisition unit such that the vehicle 1 conforms to the new target trajectory or target position.

Also, the correction unit 44 corrects the target trajectory on the basis of the travel position acquired by the travel position acquisition unit 26. The travel control unit 120 performs steering control using the steering device 92 on the basis of the steering angle speed acquired by the steering angle acquisition unit 32 such that the vehicle 1 follows the new target trajectory.

In the control device 100 with the aforementioned overall configuration, driving force shift control and gear change control are performed as follows in response to a command from the travel control unit 120 when an automated driving release request for releasing the automated driving mode during the travel of the vehicle 1 in the automated driving mode (including temporary parking) and switching the automated driving mode to the manual driving mode (at the time of switching the driving mode) is made in the embodiment. Next, details thereof will be described.

[Driving Force Shifting Control at the Time of Switching Driving Mode]

The travel control unit 120 performs control for gradually shifting the driving force of the vehicle 1 from the driving force of the vehicle 1 in the automated driving mode to the driving force that the driver of the vehicle 1 requests in the manual driving mode at the time of switching the driving mode.

[Gear Change Control at Time of Switching Driving Mode]

Also, in the control device 100 of the vehicle 1 according to the embodiment, the travel control unit 120 decides a gear range of the automated transmission TM on the basis of the driving force of the vehicle 1 when the automated driving release request is provided. Here, the travel control unit 120 can select ordinary gear change control and gear change restricting control for restricting the change in gear change as compared with the ordinary gear change control. Then, the travel control unit 120 selects which of the ordinary gear change control and the gear change restricting control is to be performed by determining the state of the accelerator pedal 70 at the time of switching the driving mode.

In the embodiment, there are two types of gear change restricting control as the gear change restricting control at the time of switching the driving mode. Specifically, as the two types of gear change restricting control, there are first gear change restricting control for maintaining a gear range for a predetermined period of time when the automated driving release request is provided and second gear change restricting control for restricting the change in gear range by expanding the range of the driving force that uses the gear range when the automated driving release request is provided as compared with the ordinary range (expanding the range of the upshift lines and the downshift lines set for the respective gear ranges).

Also, in a case in which the gear range of the automated transmission TM is decided, the AT-ECU 5 (and the travel control unit 120 that gives instructions thereto) switches the gear ranges of the automated transmission TM in accordance with the shift map selected from the shift maps 55 of the plurality of types as described above. The shift maps 55 according to the embodiment includes at least an ordinary shift map 55*a* (ordinary shift map) that is used in a case in which the ordinary gear change control is performed and a first shift map 55*b* and a second shift map 55*c* that are used in a case in which the change in gear range is restricted as compared with the ordinary shift map 55*a*. Here, the first shift map 55*b* is used in a case of performing the aforementioned first gear change restricting control. The second shift map 55*c* is performed in a case of performing the aforementioned second gear change restricting control.

Next, the gear change control at the time of switching the driving mode according to the embodiment will be described in detail. In the description, the first gear change restricting control and the second gear change restricting control that are main two types of gear change restricting control will be described first in detail, and an overall flow of the gear change control using them will then be described.

First, details of the first gear change restricting control will be described. In the first gear change restricting control, control for maintaining a gear range for a predetermined period of time when the automated driving release request is provided (shift maintaining control) is performed in a case in which conditions of the first gear change restricting control are met. Note that the length of the predetermined period of time that is a time during which the gear range is held is decided on the basis of an operation performed on the accelerator pedal 70. Specifically, the time during which the gear range is held is set to be relatively short in a case in which no operation is performed on the accelerator pedal 70, and the time during which the gear range is held is set to be relatively long in a case in which an operation is performed on the accelerator pedal 70. Details will be described below.

Figure 3:
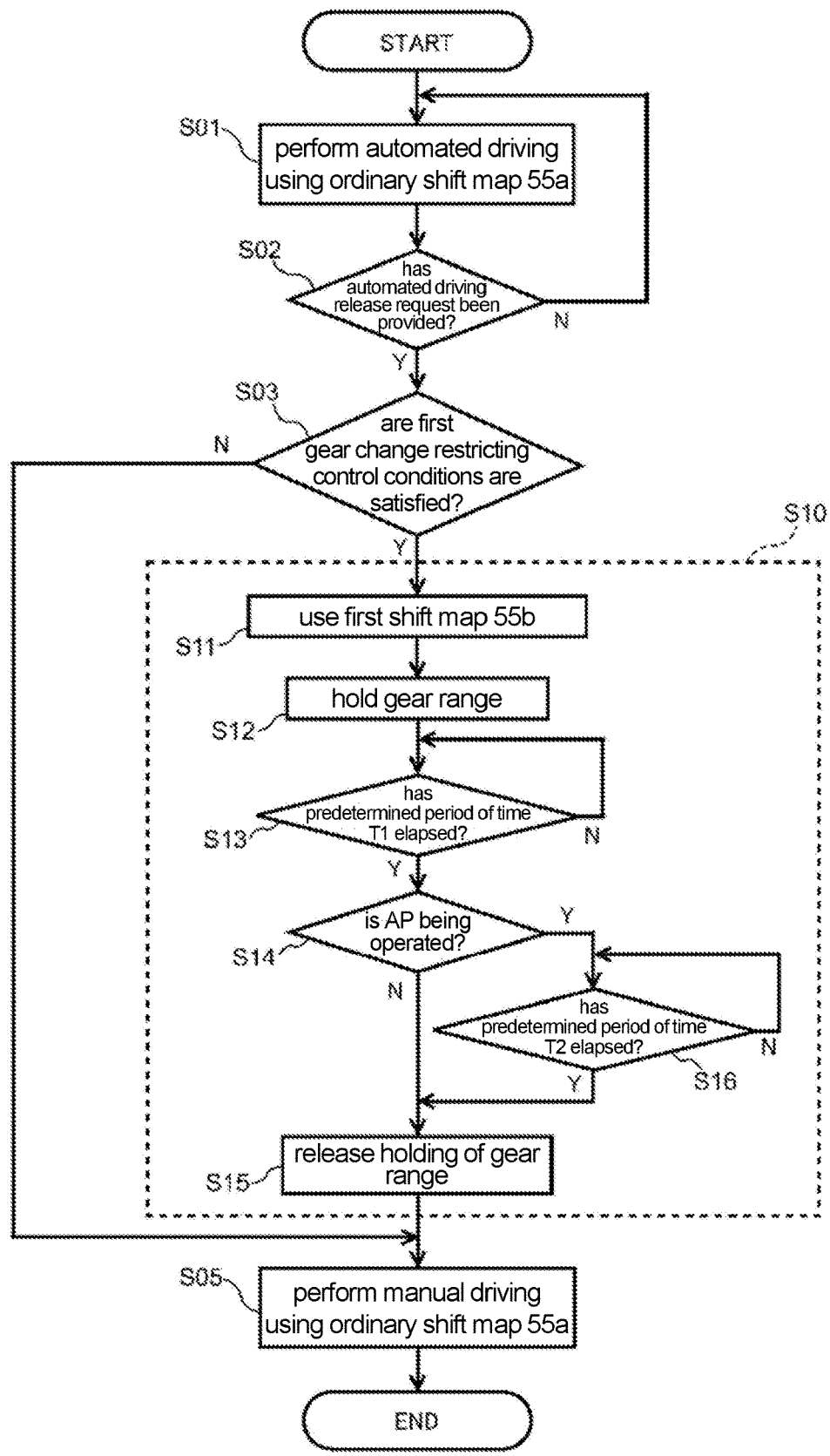
FIG. 3 is a flowchart illustrating a procedure of first gear change restricting control at the time of switching driving mode.

FIG. 3 is a flowchart illustrating a procedure for the first gear change restricting control at the time of switching the driving mode. In the control illustrated in FIG. 3, Step S10 is the first gear change restricting control. As illustrated in FIG. 3, the gear change control is performed using the ordinary shift map 55*a* among the shift maps 55 in the automated driving mode (Step S01). Here, the driving mode are switched when the automated driving release request for releasing the automated driving mode and switching the automated driving mode to the manual driving mode is provided (Step S02).

Here, it is determined whether or not the first gear change restricting control conditions (which will be described later) are satisfied (Step S03), and in a case in which the conditions are not satisfied, the ordinary gear change control using the ordinary shift map 55*a* to perform the manual driving is performed (Step S05). In this case, the gear change control in the automated driving mode is taken over to the gear change control in the manual driving mode without performing the first gear change restricting control at the time of switching the driving mode.

Meanwhile, it is determined whether or not the first gear change restricting control conditions are satisfied (Step S03), and in a case in which the conditions are satisfied, the control is shifted to the first gear change restricting control (shift maintaining control) for maintaining the gear range for a predetermined period of time when the automated driving release request is provided (Step S10).

Specifically, the gear change control using the first shift map 55*b* is performed (Step S11), and the gear range at the time of switching the driving mode is held (Step S12) in the first gear change restricting control. Then, it is determined whether or not a predetermined period of time T1 has elapsed (Step S13), and in a case in which the predetermined period of time T1 has elapsed, it is determined whether or not the accelerator pedal 70 is being operated (represented as "AP" in the drawing, and the same applies to the following drawings) until then (Step S14).

Here, if the accelerator pedal 70 is not being operated, the maintaining of the gear range is released (Step S15). Meanwhile, in a case in which the accelerator pedal 70 is being operated, it is further determined whether or not a predetermined period of time T2 has elapsed (Step S16). In a case in which the predetermined period of time T2 has elapsed, maintaining of the gear range is released (Step S15). If the gear range is released, the first gear change restricting control is ended, and the ordinary gear change control for performing manual driving is performed using the ordinary shift map 55*a* (Step S05).

In this manner, in the case in which the first gear change restricting control conditions are satisfied, the gear range is held without being changed for the predetermined period of time T1 or a time obtained by adding the predetermined period of time T2 to the predetermined period of time T1 in accordance with the operation performed on the accelerator pedal 70 in the first gear change restricting control.

Figure 4A:
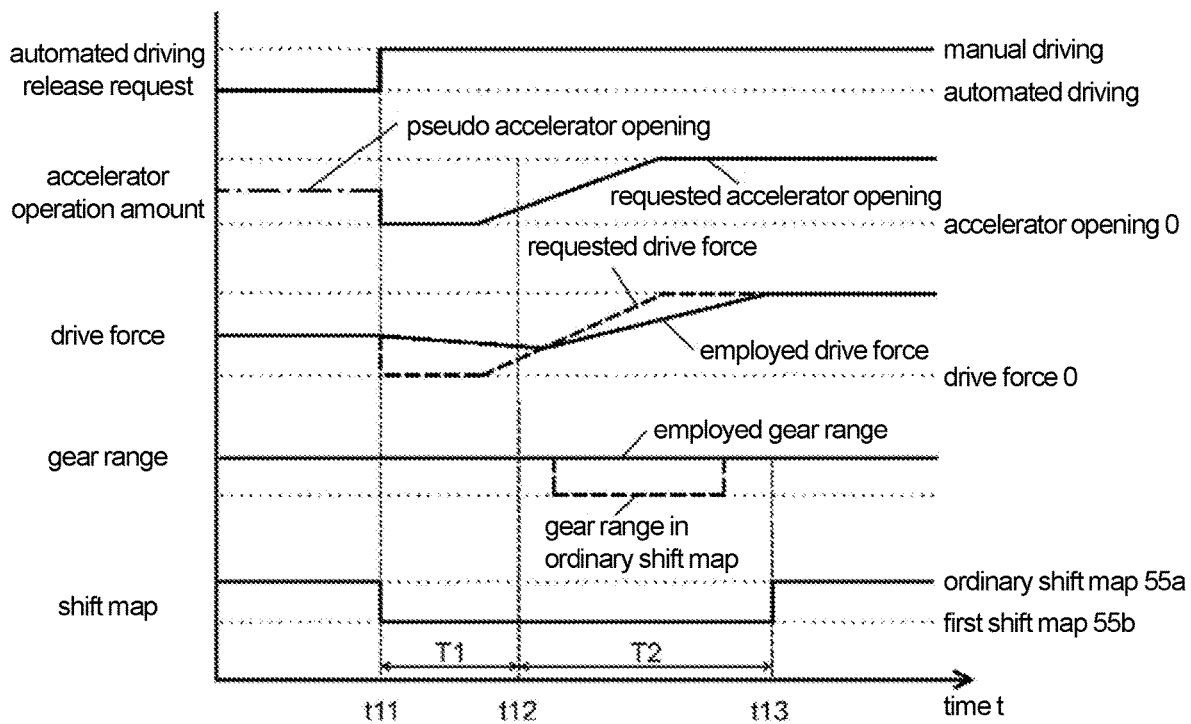
FIG. 4(a) and FIG. 4(b) are timing charts illustrating an example of behavior in a case in which the first gear change restricting control is used.
Figure 4B:
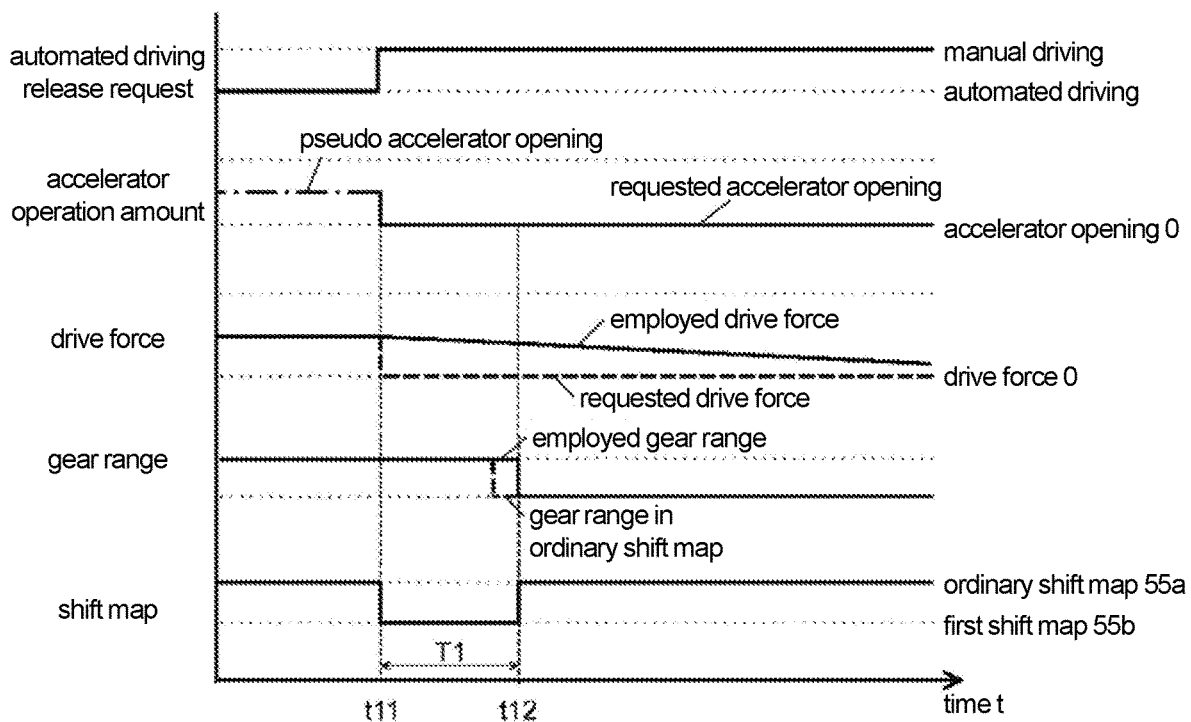

Next, an example of the case in which the first gear change restricting control will be described. FIG. 4(*a*) and FIG. 4(*b*) are timing charts illustrating an example of behavior in the case in which the first gear change restricting control is performed, where FIG. 4(*a*) illustrates a case in which the accelerator pedal 70 is operated in the process and FIG. 4(*b*) illustrates a state in which the accelerator pedal 70 is not being operated.

As illustrated in FIG. 4(*a*), the vehicle 1 travels in the automated driving mode until the time t11. In this case, the amount of operation of the accelerator is accelerator opening (pseudo accelerator opening) in automated driving, and corresponding to this, driving force based on the pseudo accelerator opening is generated. In addition, a gear range based on the ordinary shift map 55*a* is employed for the gear change control.

At the clock time t11, the driving force that the driver requests is zero in the case in which the automated driving release request is provided and the driver is not operating the accelerator pedal 70. Here, the travel control unit 120 does not set the driving force to be employed to zero and performs control for gradually shifting the driving force to the driving force that the driver of the vehicle 1 requests in order to perform the driving force shifting control at the time of switching the driving mode. Also, in a case in which the first gear change restricting control conditions are satisfied in the gear change control at the time t11, the shift maps 55 are changed from the ordinary shift map 55*a* to the first shift map 55*b*. In this manner, the first gear change restricting control is started, and the state is shifted to a shift maintained state in which the gear change is not changed for the predetermined period of time T1.

In a case in which the accelerator pedal 70 is being operated at the time t12 after the predetermined period of time T1 elapses from the time t11, the first gear change restricting control is further continued, and the shift maintained state in which the gear range is not changed is continued for the predetermined period of time T2. Therefore, the gear range is not changed for the predetermined period of time T2 even if such accelerator opening that the downshift is to be performed is reached in the ordinary shift map 55*a*.

If the first gear change restricting control is released at the clock time t13 after the predetermined period of time T2 elapses from the time t12, the shift maps 55 are changed from the first shift map 55*b* to the ordinary shift map 55*a* in the gear change control. In this manner, a gear range based on the ordinary shift map 55*a* is selected in the gear change control.

Meanwhile, in a case in which the accelerator pedal 70 is not being operated at the clock time t12 after the predetermined period of time T1 elapses from the clock time t11 as illustrated in FIG. 4(*b*), the first gear change restricting control is released at the time t12. Then, the shift maps 55 are changed from the first shift map 55*b* to the ordinary shift map 55*a* in the gear change control. In this manner, the gear range based on the ordinary shift map 55*a* is selected in the gear change control.

In this manner, in the case in which the first gear change restricting control is performed, and the accelerator pedal 70 is operated in the process, the time during which the gear range is held is a time obtained by adding the predetermined period of time T1 to the predetermined period of time T2. Meanwhile, in the case in which the accelerator pedal 70 is not being operated even after the elapse of the predetermined time T1 from the switching of the driving mode, the time during which the gear range is held is only in the predetermined period of time T1.

Therefore, in the case in which the first gear change restricting control is performed, and the accelerator pedal 70 is operated in the process, the time during which the gear range is held becomes relatively long. Meanwhile, in the case in which the accelerator pedal 70 is not operated in the process, the time during which the gear change is held becomes relatively short.

Next, details of the second gear change restricting control will be described. In the second gear change restricting control, control for restricting the change in gear change is performed by expanding the range of the driving force that uses the gear range when the automated driving release request is provided as compared with the ordinary range in a case in which conditions of the second gear change restricting control are satisfied.

Figure 5:
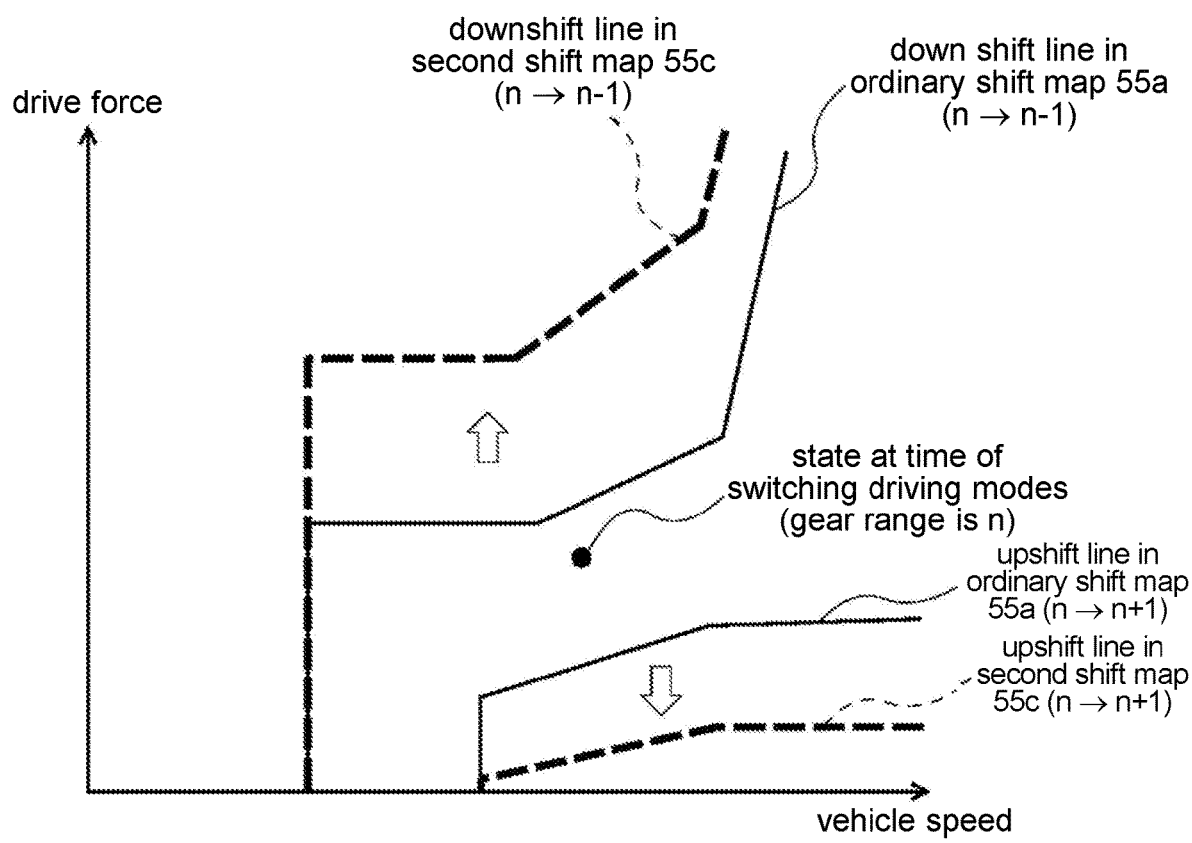
FIG. 5 is a diagram for describing an outline of a second shift map that is used in second gear change restricting control.

FIG. 5 is a diagram for describing an outline of the second shift map 55*c* that is used in the second gear change restricting control. The shift map illustrated as an example in FIG. 5 represents a relationship between the vehicle speed and the driving force that is determined on the basis of the accelerator opening. Also, in a case in which the gear range at the time of switching the driving mode is assumed to be n, a line of downshifting to n−1 and a line of upshifting to n+1 are illustrated, and the ordinary shift map 55*a* and the second shift map 55*c* are compared with each other in an overlaid manner. As illustrated in FIG. 5, the width between the upshift line and the downshift line of the second shift map 55*c* is wider than the width of the upshift line and the downshift line of the ordinary shift map 55*a*. In this manner, if the range of the driving force that uses the gear range when the automated driving release request is provided is expanded than the ordinary range (as represented by the arrow in the drawing, the range between the upshift line and the downshift line set for each gear is expanded), the change in the gear range of the automated transmission TM is restricted.

Figure 6:
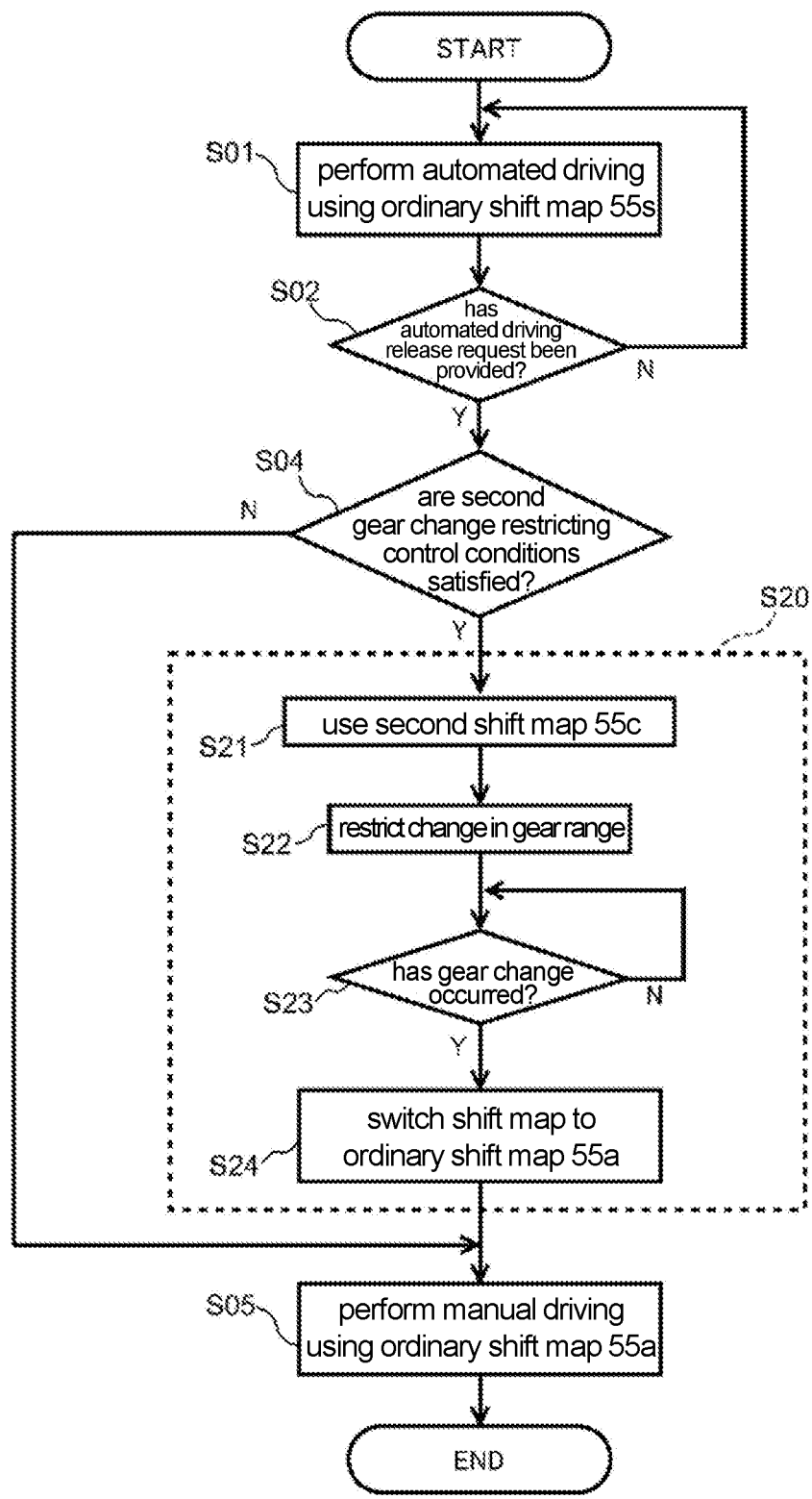
FIG. 6 is a flowchart illustrating a procedure of the second gear change restricting control at the time of switching driving mode.

FIG. 6 is a flowchart illustrating a procedure for the second gear change restricting control at the time of switching the driving mode. In the control illustrated in FIG. 6, Step S20 is the second gear change restricting control. As illustrated in FIG. 6, the gear change control is performed using the ordinary shift map 55*a* among the shift maps 55 in the automated driving mode (Step S01). Here, when the automated driving release request for releasing the automated driving mode and switching the automated driving mode to the manual driving mode is provided (Step S02), the driving mode is switched.

Here, it is determined whether or not the second gear change restricting control conditions (which will be described later) are satisfied (Step S04), and in the case in which the conditions are not satisfied, the ordinary gear change control for performing manual driving using the ordinary shift map 55*a* is performed (Step S05). In this case, the second gear change restricting control at the time of switching the driving mode is not performed, and the gear change control in the automated driving mode is taken over to the gear change control in the manual driving mode.

Meanwhile, it is determined whether or not the second gear change restricting control conditions are satisfied (Step S04), and in the case in which the conditions are satisfied, the control is shifted to the second gear change restricting control for restricting the change in gear range by expanding the range of the driving force that uses the gear range when the automated driving release request is provided as compared with the ordinary range (Step S20).

Specifically, gear change control using the second shift map 55*c* is performed (Step S21) such that it becomes difficult to change the gear range at the time of switching the driving mode (Step S22) in the second gear change restricting control. Thereafter, in a case in which the speed or the driving force of the vehicle 1 reaches the upshift line or the downshift line of the second shift map 55*c*, the gear range is changed (Step S23). At this time, the ordinary gear change control for performing manual driving using the ordinary shift map 55*a* is performed (Step S05) by changing the shift maps to the ordinary shift map 55*a* (Step S24) to end the second gear change restricting control.

Figure 7A:
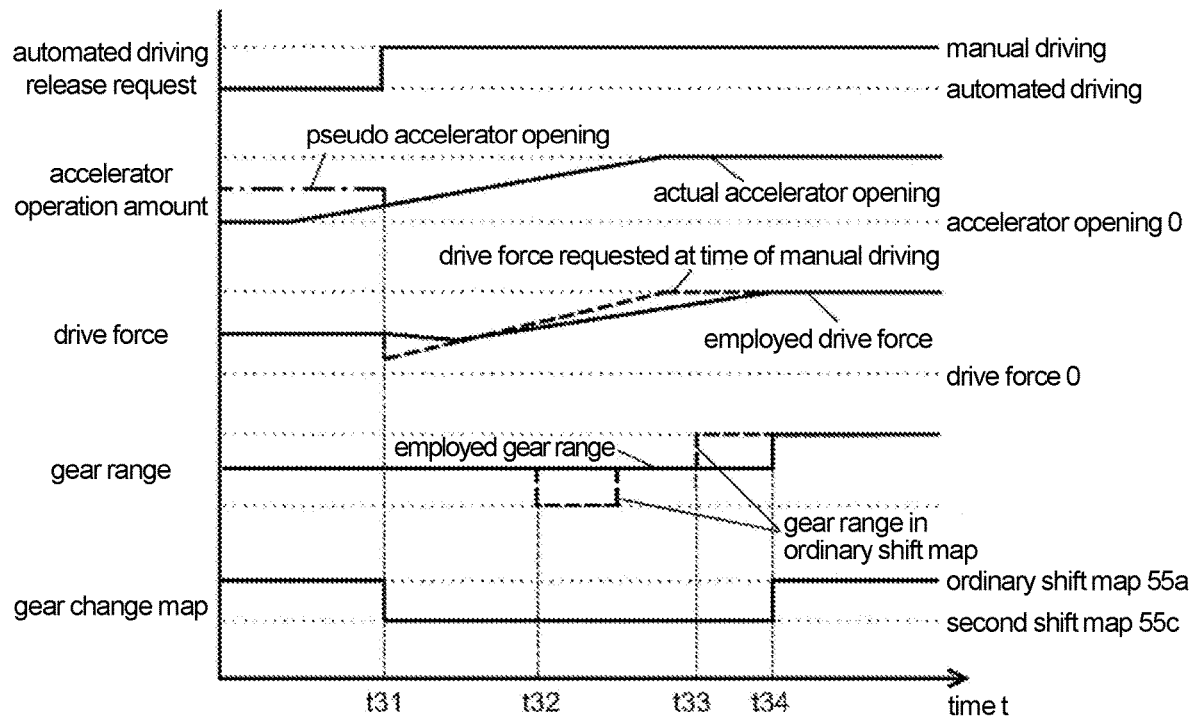
FIG. 7(a) and FIG. 7(b) are timing charts illustrating an example of behavior in a case in which the second gear change restricting control is used.

Next, an example of the case in which the second gear change restricting control is performed will be described. FIG. 7(*a*) and FIG. 7(*b*) are timing charts illustrating an example of behavior in the case in which the second gear change restricting control is performed, where FIG. 7(*a*) illustrates a case in which upshifting is performed and FIG. 7(*b*) illustrates a case in which downshifting is performed.

As illustrated in FIG. 7(*a*), the vehicle 1 travels in the automated driving mode until the time t31. In this case, the amount of operation of the accelerator is accelerator opening (pseudo accelerator opening) in automated driving, and corresponding to this, driving force based on the pseudo accelerator opening is generated. In addition, the gear range based on the ordinary shift map 55*a* is employed in the gear change control.

In a case in which the automated driving release request is provided at the time t31, the driver is operating the accelerator pedal 70 and increases the accelerator opening while the pseudo accelerator opening is not reached. Here, the travel control unit 120 does not completely match the driving force to be employed with the driving force that the driver requests and performs control for gradually shifting the driving force to the driving force that the driver of the vehicle 1 requests in order to perform the driving force shifting control at the time of switching the driving mode.

Then, in the case in which the second gear change restricting control conditions are satisfied, the shift maps 55 are changed from the ordinary shift map 55a to the second shift map 55c in the gear change control at the time t31. In this manner, the second gear change restricting control is started. Since the aforementioned width between the upshift line and the downshift line in the second shift map 55c is wider than that in the ordinary shift map 55a, the gear range is not changed at the time t32 and the time t33.

If the upshift line in the second shift map 55c is reached at the time t34, upshifting is performed, and the second gear change restricting control is thus ended. In this manner, the gear change is selected on the basis of the ordinary shift map 55a in the gear change control at and after the time t34.

Figure 7B:
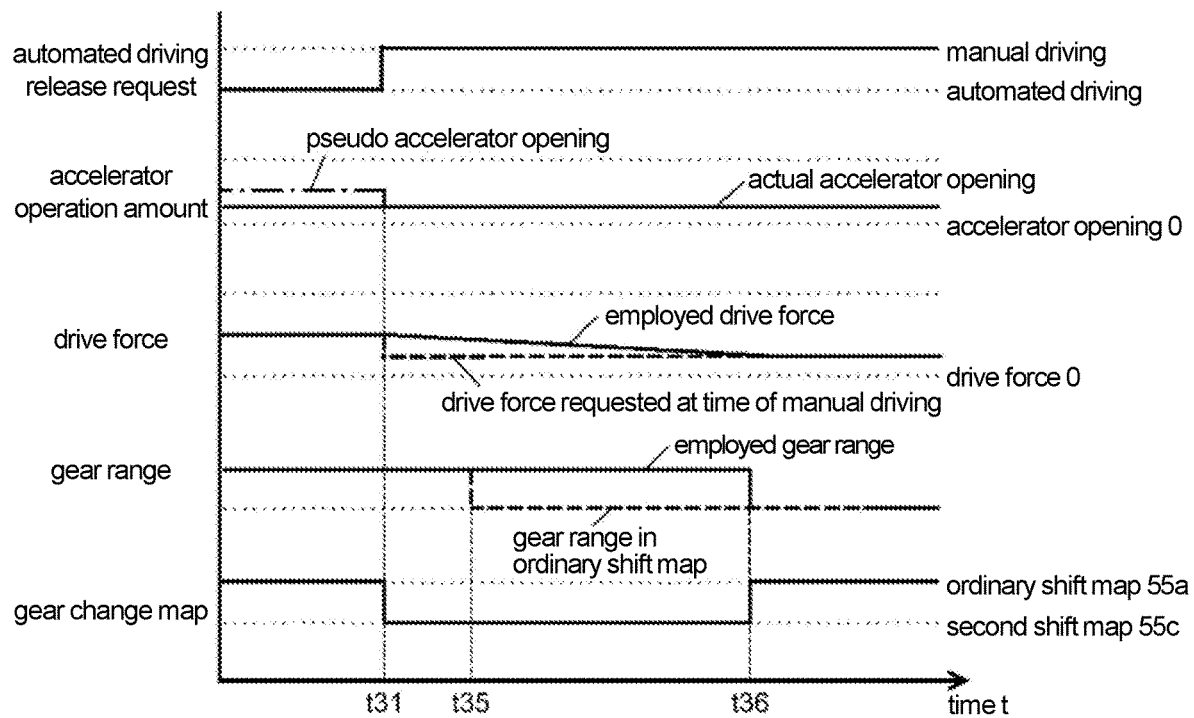

Meanwhile, in the case in which the automated driving release request is provided at the time t31 as illustrated in FIG. 7(b), the driver is operating the accelerator pedal 70 and does not increase the accelerator opening in the state in which the pseudo accelerator opening is not reached.

Then, in the case in which the second gear change restricting control conditions are satisfied in the gear change control at the time t31, the shift maps 55 are changed from the ordinary shift map 55a to the second shift map 55c. In this manner, the second gear change restricting control is started. The aforementioned width between the upshift line and the downshift line in the second shift map 55c with which is wider than that in the ordinary shift map 55a, and the gear change of the gear range does not occur even at the time t35.

If the downshift line in the second shift map 55c is reached at the time t36, downshifting is performed, and the second gear change restricting control is thus ended. In this manner, the gear range based on the ordinary shift map 55a is selected in the gear change control at and after the time t36.

Figure 8:
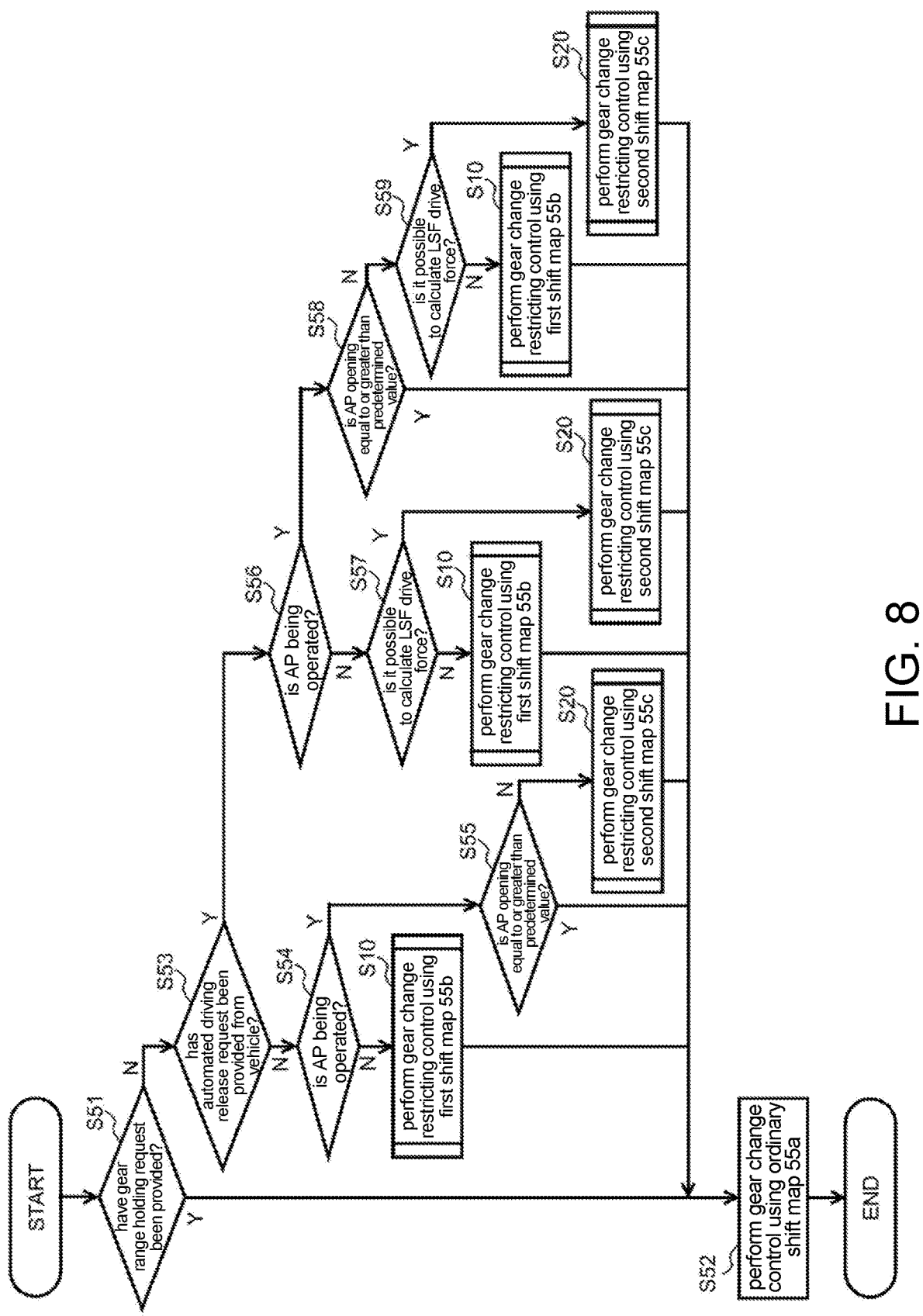
FIG. 8 is a flowchart illustrating a procedure of overall gear change control at the time of switching driving mode.

Next, how the gear change control is specifically performed at the time of switching the driving mode will be described as an example by using the aforementioned first gear change restricting control and second gear change restricting control. FIG. 8 is a flowchart illustrating a procedure for overall gear change control at the time of switching the driving mode.

At the time of switching the driving mode, whether or not there has been a request for maintaining a predetermined gear range is determined first (Step S51). At this time, in a case in which there has been a request for maintaining the predetermined gear range, such as a case in which the driver has operated the paddle switch 65, the gear change restricting control is not performed since priority is placed on the driver's operation. In this case, the gear range based on the ordinary shift map 55a is selected (Step S52).

It is determined whether or not there has been a request for maintaining the predetermined gear range from the driver (Step S51), and in a case in which there has been no request for maintaining the gear range from the driver, it is determined whether or not the automated driving release request has been provided from the vehicle 1 (Step S53). In a case in which the automated driving release request has not been provided from the vehicle 1, it is determined that the automated driving release request has been provided from the driver.

In a case in which it is determined that the automated driving release request has been provided from the driver in Step S53, it is determined whether or not the driver is operating the accelerator pedal 70 (Step S54).

In a case in which the accelerator pedal 70 is not being operated in Step S54, the control is shifted to the aforementioned first gear change restricting control, and the gear change control using the first shift map 55b is performed (Step S10). Thereafter, the ordinary gear change control is performed (Step S52).

In a case in which the accelerator pedal 70 is being operated in Step S54, the accelerator opening of the accelerator pedal 70 is determined (Step S55).

In A case in which the accelerator opening of the accelerator pedal 70 is equal to or greater than a predetermined value in Step S55, for example, in a case in which the driving force that the driver requests exceeds the driving force for the automated driving, such as a case in which the accelerator opening of the driver exceeds pseudo accelerator opening at the time of the automated driving, it is determined that the driver intends to perform overriding (operation intervention), and priority is placed on the driver's operation. In this case, both types of the gear change restricting control are not performed, and ordinary gear change control is performed (Step S52).

In a case in which the accelerator opening of the accelerator pedal 70 is less than the predetermined value in Step S55, the control is shifted to the aforementioned second gear change restricting control, and gear change control using the second shift map 55c is performed (Step S20). Thereafter, the ordinary gear change control is performed (Step S52).

In a case in which the automated driving release request has been provided from the vehicle 1 in Step S53 described above, the gear change control is performed in the following procedure. Note that in the following description, LSF represents adaptive cruise control (ACC) with a low-speed following (LSF) control function. LSF is control for constantly maintaining the inter-vehicle distance from the preceding vehicle that is traveling in front of the host vehicle in the same direction as that of the host vehicle and automatically stopping the host vehicle regardless of a driver's operation when the preceding vehicle is in a low-speed region or in a stopping state, and is also called low-speed following travel mode.

First, it is determined whether or not the driver is operating the accelerator pedal 70 (Step S56). In a case in which the accelerator pedal 70 is not being operated in Step S56, it is determined whether or not it is possible to calculate driving force at the time of LSF (Step S57). In a case in which it is not possible to calculate the driving force at the time of LSF in Step S57, the control is shifted to the aforementioned first gear change restricting control, and the gear change control using the first shift map 55b is performed (Step S10). Thereafter, the ordinary gear change control is performed (Step S52). In a case in which it is possible to calculate the driving force at the time of LSF in Step S57, the control is shifted to the aforementioned second gear change restricting control, and the gear change control using the second shift map 55c is performed (Step S20). Thereafter, the ordinary gear change control is performed (Step S52).

In a case in which the accelerator pedal 70 is being operated in Step S56, the accelerator opening of the accelerator pedal 70 is determined (Step S58).

In a case in which the accelerator opening of the accelerator pedal 70 is equal to or greater than the predetermined value in Step S58, for example, in a case in which the driving force that the driver requests exceeds the driving force for the automated driving, such as a case in which the accelerator opening of the driver exceeds the pseudo accelerator opening at the time of the automated driving, it is determined that the driver intends to perform overriding (operation intervention), and priority is placed on the driver's operation. In this case, both the two types of gear change restricting control are not performed, and the ordinary gear change control is performed (Step S52).

In a case in which the accelerator opening of the accelerator pedal 70 is less than the predetermined value in Step S58, it is determined whether or not it is possible to calculate the driving force at the time of LSF (Step S59). In a case in which it is not possible to calculate the driving force at the time of LSF in Step S59, the control is shifted to the aforementioned first gear change restricting control, and the gear change control using the first shift map 55b is performed (Step S10). Thereafter, the ordinary gear change control is performed (Step S52). In a case in which it is possible to calculate the driving force at the time of LSF in Step S59, the control is shifted to the aforementioned second gear change restricting control, and the gear change control using the second shift map 55c is performed (Step S20). Thereafter, the ordinary gear change control is performed (Step S52).

In this manner, the first gear change restricting control is performed in a case in which it is determined that the automated driving release request has been provided from the vehicle 1 and it is not possible to calculate the driving force of the vehicle 1, and the second gear change restricting control is performed in a case in which it is possible to calculate the driving force of the vehicle 1.

As described above, it is determined whether or not to restrict the change in gear range of the automated transmission TM on the basis of the operation performed by the driver on the accelerator pedal 70 at the time of switching the driving mode in response to the automated driving release request during the traveling of the vehicle 1 according to the embodiment. Therefore, it is possible to prevent sudden acceleration or deceleration of the vehicle and vibration of the vehicle due to a gear change that the driver does not expect. Also, no new members are needed since the gear change is restricted through the control performed by the travel control unit 120. Therefore, it is possible to curve the gear change with a simple configuration without any increase in the number of members. Accordingly, it is possible to smoothly switch the driving mode with a simple configuration.

Also, the embodiment employs the configuration in which there are a plurality of shift maps 55, namely the ordinary shift map 55a, the first shift map 55b, and the second shift map 55c in accordance with the gear change control of the plurality of types, namely the ordinary gear change control, the first gear change restricting control, and the second gear change restricting control. Then, the gear change control is performed using different shift maps 55 when the gear change control is performed. In this manner, it is possible to perform control with a simple configuration.

In addition, control for maintaining the gear range when the automated driving release request is provided during the predetermined period of time is performed as the first gear change restricting control in the embodiment. In this manner, the gear range at the time of switching the driving mode is reliably held for the predetermined period of time even after switching the driving mode. Therefore, it is possible to prevent sudden acceleration or deceleration of the vehicle and vibration of the vehicle due to the gear change operation.

In addition, the length of the predetermined period of time during which the gear range is held after switching the driving mode is decided on the basis of the driver's operation on the accelerator pedal 70 according to the embodiment. In this manner, gear change control as the driver intends can further be performed.

In addition, it is considered that the driver does not need further driving force in a case in which the accelerator pedal 70 has not been operated for a while after switching the driving mode in the embodiment. In this case, the predetermined time during which the gear range is held is set to be shorter since the gear change that the driver does not expect is not performed even if the ordinary gear change is performed. Meanwhile, in a case in which the accelerator pedal 70 has been operated after switching the driving mode, the time during which the gear range is held and the gear change operation is restricted is set to be long, and an unexpected gear change operation is prevented. Therefore, it is possible to set the predetermined time during which the gear range is held to a reasonable length.

In addition, the control for expanding the range of the driving force that uses the gear range when the automated driving release request is provided as compared with the ordinary range is performed as the second gear change restricting control according to the embodiment. In this manner, it is easier to continue the gear range at the time of switching the driving mode even after switching the driving mode, and it is possible to restrict the gear change. Therefore, it is possible to prevent sudden acceleration or deceleration of the vehicle and vibration of the vehicle due to the gear change operation.

In addition, in the case in which it is possible to calculate the driving force in the low-speed following travel mode, the control for restricting the change in gear range is performed by expanding the range of the driving force that uses the gear range when the automated driving release request is provided as compared with the ordinary range in the gear change restricting control. In this manner, it is possible to perform appropriate gear change restricting control and to prevent sudden acceleration or deceleration of the vehicle and vibration of the vehicle due to the gear change operation.

In addition, in a case in which it is not possible to calculate the driving force in the low-speed following travel mode, the gear change restricting control is performed by maintaining the gear range for the predetermined period of time according to the embodiment. In this manner, it is possible to prevent sudden acceleration or deceleration of the vehicle and vibration of the vehicle due to the gear change operation.

In addition, it is possible to prevent sudden acceleration or deceleration of the vehicle and vibration of the vehicle by performing the driving force shifting control for gradually shifting the driving force of the vehicle from the driving force for the vehicle in the automated driving mode to the driving force that the driver requests in the manual driving mode.

Although the embodiments of the disclosure have been described above, the disclosure is not limited to the aforementioned embodiments, and various modifications can be made within the scope of the claims and the scope of the technical ideas described in the specification and the drawings. For example, although whether or not to restrict the change in gear range is decided on the basis of the opening of the accelerator pedal 70 in the aforementioned embodiments, the decision may be made on the basis of other operation elements.

What is claimed is:

1. A control device for a vehicle, capable of switching between an automated driving mode in which a driving force of a vehicle that has a power source and a transmission that performs a gear change for rotation using a power delivered from the power source is automatically controlled and a manual driving mode in which the driving force of the vehicle is controlled on a basis of a driver's operation on the vehicle, the control device comprising:
   an operation element comprising an accelerator pedal to which the driver's operation is input in order to control the driving force of the vehicle;
   a memory; and
   a processor configured to perform:
   a switching control for switching between the automated driving mode and the manual driving mode; and
   a travel control;
   wherein in the travel control, the processor is configured to output a travel control command value including a command value for selecting a gear range of the transmission,
   wherein in the travel control the processor is further configured to perform:
      deciding the gear range of the transmission on a basis of the driving force of the vehicle, and
      selecting an ordinary gear change control or a gear change restricting control that restricts a change in gear range as compared with the ordinary gear change control, and
      selecting which of the ordinary gear change control and the gear change restricting control is to be performed on a basis of an operation performed on the accelerator pedal of the operation element when there is an automated driving release request in which the automated driving mode is released and the automated driving mode is switched to the manual driving mode during traveling of the vehicle in the automated driving mode,
   wherein when the automated driving release request in which the automated driving mode is released and the automated driving mode is switched to the manual driving mode is provided during traveling of the vehicle in the automated driving mode, the processor is configured to perform a driving force shifting control for gradually shifting the driving force of the vehicle from the driving force of the vehicle in the automated driving mode to the driving force that the driver requests in the manual driving mode.

2. The control device for a vehicle according to claim 1, further comprising:
   a plurality of shift maps that are stored in the memory and for deciding the gear range of the transmission, and
   wherein in the travel control the processor is further configured to perform:
      uses an ordinary shift map stored in the memory in a case in which the ordinary gear change control is performed, and
      uses a shift map that is stored in the memory and used for restricting the change in gear range as compared with the ordinary shift map in a case in which the gear change restricting control is performed.

3. The control device for a vehicle according to claim 1, wherein the gear change restricting control includes a control for restricting the change in gear range by expanding a range of the driving force that uses the transmission range when the automated driving release request is provided as compared with an ordinary range.

4. The control device for a vehicle according to claim 1, wherein the gear change restricting control includes a control for maintaining the gear range for a predetermined period of time when the automated driving release request is provided.

5. The control device for a vehicle according to claim 4, wherein a length of the predetermined period of time is decided on a basis of the operation performed on the operation element.

6. The control device for a vehicle according to claim 5, wherein the predetermined period of time is set to be short in a case in which no operation is performed on the operation element, and the predetermined period of time is set to be long in a case in which an operation is performed on the operation element.

7. The control device for a vehicle according to claim 1,
   wherein a low-speed following travel mode in which the vehicle follows a preceding vehicle in a low-speed region is provided,
   the automated driving release request is input from the vehicle or the driver, and
   in a case in which the automated driving release request has been input from the vehicle, and in a case in which the driving force of the vehicle in the low-speed following travel mode is not able to be calculated in the travel control, the processor is configured to perform a control for restricting the change in gear range by expanding the range of the driving force that uses the gear range when the automated driving release request is provided as compared with an ordinary range in the gear change restricting control.

8. The control device for a vehicle according to claim 1,
   wherein a low-speed following travel mode in which the vehicle follows a preceding vehicle in a low-speed region is provided,
   the automated driving release request is input from the vehicle or the driver, and
   in a case in which the automated driving release request has been input from the vehicle, and in a case in which the driving force of the vehicle in the low-speed following travel mode is not able to be calculated in the travel control, the processor is configured to perform a control for maintaining the gear range for a predetermined period of time when the automated driving release request is provided in the gear change restricting control.

* * * * *